W. B. COATS.
TIRE CASING VULCANIZER AND REBUILDER.
APPLICATION FILED JUNE 25, 1918.
1,333,062.
Patented Mar. 9, 1920.
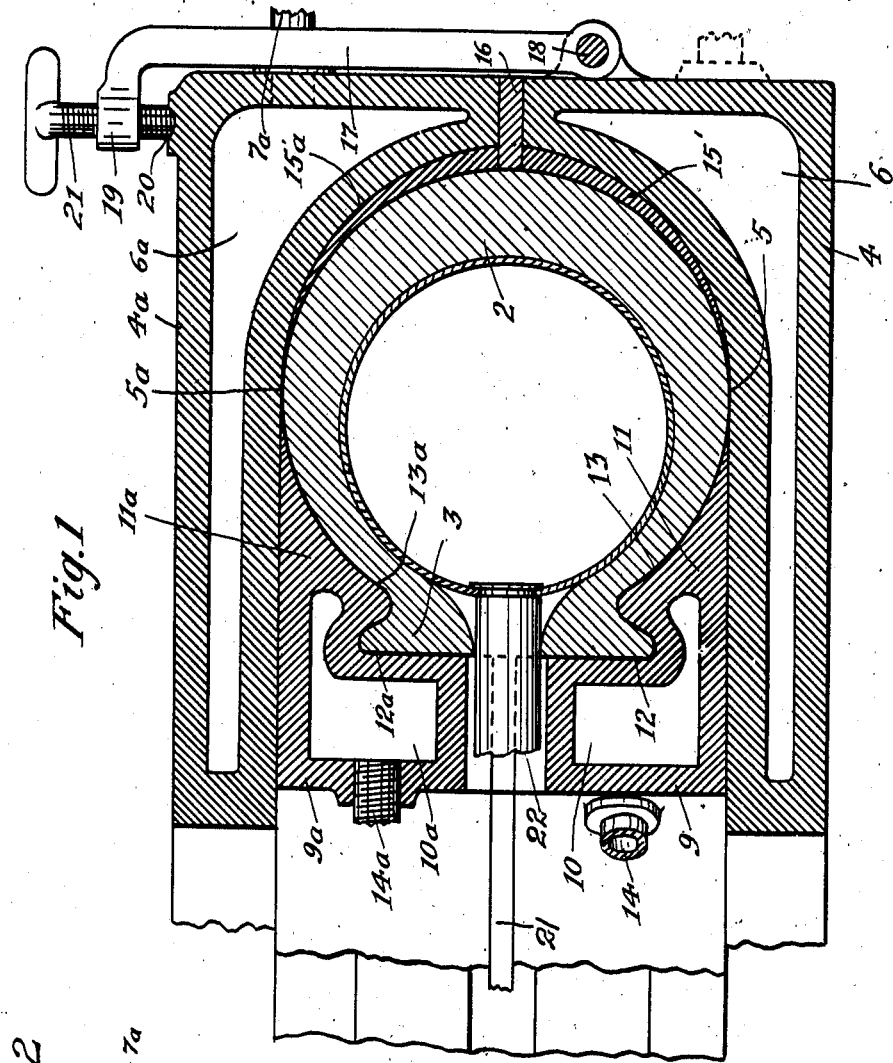
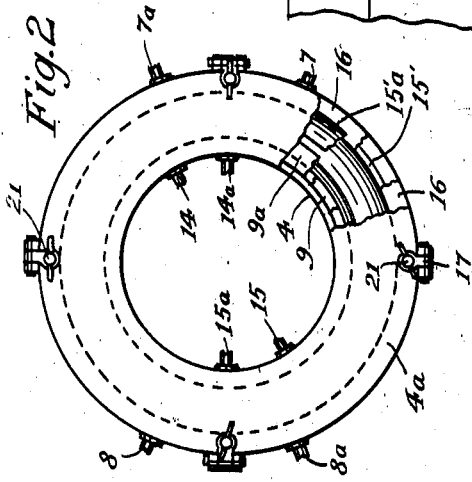
Inventor:
William B. Coats.
By Paul Paul
his Attorneys

UNITED STATES PATENT OFFICE.

WILLIAM B. COATS, OF FARIBAULT, MINNESOTA.

TIRE-CASING VULCANIZER AND REBUILDER.

1,333,062. Specification of Letters Patent. Patented Mar. 9, 1920.

Application filed June 25, 1918. Serial No. 241,728.

*To all whom it may concern:*

Be it known that I, WILLIAM B. COATS, a citizen of the United States, resident of Faribault, county of Rice, State of Minnesota, have invented certain new and useful Improvements in Tire-Casing Vulcanizers and Rebuilders, of which the following is a specification.

The object of my invention is to provide a means for vulcanizing and rebuilding a tire casing or shoe which will allow the application of pressure and heat to the entire surface of the casing with one adjustment of the device upon the casing and at one operation.

A further object is to provide a vulcanizing means which can be readily adapted for different sizes of tires and will require no re-adjusting in case there are several punctures or blowouts in the casing to be repaired.

Other objects of the invention will appear from the following detailed description.

The invention consists generally in various constructions and combinations, all as hereinafter described and particularly pointed out in the claim.

In the accompanying drawings forming part of this specification,

Figure 1 is a transverse sectional view through a tire showing the application of my improved vulcanizing and rebuilding means thereto, Fig. 2 is a plan view, showing the device on the tire, ready for the application of the heating agent.

In the drawing, 2 represents a tire shoe or casing, having the usual beads 3. 4 is a casting in the form of a ring, provided with a curved surface 5 on which the tire casing is placed. This ring contains a steam chamber 6 having intake and exhaust pipes 7 and 8. A ring 9 has a steam chamber 10 therein and is provided with a flanged portion 11 that is seated on the flat upper surface of the ring 4 and is provided with an annular recess 12 to receive the bead 3 of the tire casing, the flange 11 having a curved inner face 13 which forms a continuation of the surface 5 and against which the casing adjacent its bead is seated. These rings, 4 and 9, form the lower half section of the vulcanizer. The ring 9 has a steam intake pipe 14 and an exhaust 15 on the opposite side of the ring and tire. When these rings have been placed in position, one upon the other, with the ring 4 resting upon a suitable support, or legs may be provided, as desired, the tire is laid in a horizontal position with its lower portion resting in the ring. In case a small tire is to be repaired, I provide a flaring filler ring 15′, fitting within the ring 4 and tapered in cross section to fit the tread surface of the tire, and I have also shown a flat ring 16 which is placed horizontally upon the upper edges of the ring 4 to adapt the device for tires of a certain size. Whenever desired, these filler rings may be removed to make the device conform to a tire of a different size.

The upper half or section of the vulcanizer is substantially a duplicate of the lower half, with the rings inverted, and I will designate the parts of the upper section by the same reference numerals, with the addition of the exponent "a". The upper rings are placed over the tire, provision being made for the snug fitting of them, one upon the other, and for securing the parts when assembled I provide clamping devices consisting of bails 17 pivoted at 18 on the lower section 4 and having inwardly turned upper ends 19 which overhang seats 20 provided on the ring 4$^a$. Clamping screws 21 are tapped into the end 19 and engage the seats 20 for drawing the rings together and applying the desired pressure to the tire casing. There are preferably four of these clamping bails around the periphery of the vulcanizer, as shown in Fig. 2, though this number may be varied, if preferred. The upper and lower rings have broad bearing surfaces on the rings 9 and 9$^a$, sufficient to hold them securely in place, one upon the other, and clamp the bead portion of the tire casing between them. For convenience in distinguishing the rings, I prefer to designate the rings 4 and 4$^a$ as the tire tread rings and the rings 9 and 9$^a$ as the bead rings.

When the parts of the vulcanizer have all been assembled and clamped on the casing, live steam is admitted to the steam chambers and the patched or mended portion of the casing subjected to the desired temperature suitable for vulcanizing. Air pressure admitted through pipe 21 into the internal tube 22 will press or force the casing against the walls of the tread and bead rings in the direction of the steam chambers in both the tread rings and the bead rings, thus insuring an effective union between the fabric and rubber throughout the area of the shoe or casing with the heat from the steam chambers of the tread and bead rings applied at the same time throughout the area of the shoe or casing. The whole tire being subjected to the heat at one time, I am able to vulcanize and rebuild the tire tread completely throughout its circumference in one operation and at the same time repair blowouts, punctures, or rim cuts, and thereby save considerable time and labor usually required for adjusting and readjusting a sectional vulcanizing device on the casing. When the tire has been subjected to the temperature of the steam for the desired period, the clamping devices are released, the upper ring sections removed, and the casing will then be exposed and can be readily raised out of its seat in the lower sections.

I claim as my invention:

A tire casing vulcanizer and rebuilder comprising a pair of correspondingly shaped oppositely disposed tread rings, each having a steam chamber to overlie the tread and side of a beaded tire casing, the inner wall of the steam chamber of each ring having a curved portion extending partially over the tread and the side of the tire casing and merging into a prolonged straight portion extending toward the inner edge of the ring, one ring being superposed above the other with the terminal adjacent outer edges of the two rings substantially registering one with the other; and a pair of correspondingly shaped bead rings, each having an extended straight external portion for contact with the extended straight portions of the tread rings and an inner surface conforming to the shape of the bead and side of the casing, and each formed with a steam chamber shaped to extend across the base and side portion of the casing bead, whereby air pressure within the casing will expand the casing toward the walls of the steam chambers in both the tread and bead rings.

In witness whereof I have hereunto set my hand this 11th day of June, 1918.

WILLIAM B. COATS.